(12) United States Patent
Jew et al.

(10) Patent No.: US 11,474,363 B2
(45) Date of Patent: Oct. 18, 2022

(54) METHOD FOR CO-LOCATING DISSIMILAR OPTICAL SYSTEMS IN A SINGLE APERTURE

(71) Applicant: BAE SYSTEMS Information and Electronic Systems Integration Inc., Nashua, NH (US)

(72) Inventors: Jeffrey L. Jew, Brookline, NH (US); Ian B. Murray, Amherst, NH (US); Michael J. Shaw, Epsom, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 314 days.

(21) Appl. No.: 16/718,919

(22) Filed: Dec. 18, 2019

(65) Prior Publication Data
US 2021/0191136 A1     Jun. 24, 2021

(51) Int. Cl.
*G02B 27/12* (2006.01)
*G02B 27/10* (2006.01)

(52) U.S. Cl.
CPC ....... *G02B 27/126* (2013.01); *G02B 27/1013* (2013.01)

(58) Field of Classification Search
CPC .......................... G02B 27/126; G02B 27/1013
USPC .......................................................... 359/640
See application file for complete search history.

(56) References Cited

U.S. PATENT DOCUMENTS

| 4,950,056 | A | 8/1990 | Smith |
| 8,294,988 | B2 | 10/2012 | Cook |
| 9,025,256 | B2 | 5/2015 | Cook |
| 9,140,901 | B2 | 9/2015 | Staver |
| 10,338,199 | B1 * | 7/2019 | McWhirter ........... G01S 7/4816 |
| 10,379,195 | B2 | 8/2019 | Jungwirth et al. |
| 2009/0079824 | A1 | 3/2009 | Winsor |
| 2015/0145950 | A1 | 5/2015 | Murphy et al. |
| 2016/0334618 | A1 | 11/2016 | Hargis et al. |
| 2017/0195569 | A1 | 7/2017 | Lapstun et al. |
| 2018/0045960 | A1 | 2/2018 | Palacios et al. |
| 2019/0243128 | A1 | 8/2019 | Johnson |

FOREIGN PATENT DOCUMENTS

GB         2214656 A   *   9/1989   ......... G02B 17/0852

OTHER PUBLICATIONS

International Search Report, PCT/US20/65259, dated Mar. 19, 2021, 9 pages.
International Search Report, PCT/US20/65118, dated Mar. 19, 2021, 10 pages.

* cited by examiner

*Primary Examiner* — William Choi
(74) *Attorney, Agent, or Firm* — KPIP Law, PLLC; Gary McFaline (57) ABSTRACT

The system and method for combining two optical assemblies into the same volume, particularly when the field of view of the two assemblies are different, so that the overall volume and swap for the system is reduced. This also allows both subsystems to use the same external protective window, reducing overall cost for a system of co-located dissimilar optical systems in a single aperture.

18 Claims, 11 Drawing Sheets

FIG.12

METHOD FOR CO-LOCATING DISSIMILAR OPTICAL SYSTEMS IN A SINGLE APERTURE

FIELD OF THE DISCLOSURE

The present disclosure relates to optical systems and more particularly to co-locating dissimilar optical systems in a single aperture.

BACKGROUND OF THE DISCLOSURE

It is understood that it is difficult to combine multiple optical systems into a single aperture. Additionally, low size, weight, and power (SWAP) approaches limit the dissimilarity between systems. For very dissimilar optics, typical approaches require separate apertures; and combining different wavelengths may be achieved using beam splitters. Existing applications that require two separate subsystems, each with its own external window for protection, plus separate optical assemblies for collecting and focusing the energy from the scene, and detectors for converting the energy from photons to electrons where the separate optical assemblies need a finite amount of space between them for mechanical structure, results in a large system volume.

Wherefore it is an object of the present disclosure to overcome the above-mentioned shortcomings and drawbacks associated with conventional single aperture systems comprising multiple dissimilar optical systems. Our approach is to combine the two optical assemblies into the same volume, so that the overall volume and SWAP is reduced. This also allows both subsystems to use the same external protective window, reducing overall cost.

SUMMARY OF THE DISCLOSURE

One aspect of the present disclosure is oil optical system, comprising: an outer region, wherein the outer region is a Risley prism assembly, constructed of two prism elements, and is transmissive to a first waveband; and a center section, wherein the center section is transmissive to a second waveband; the outer region and the center section are within a single aperture and the outer region may be steered by rotating the Risley prism assembly, and the center section remains unsteered during rotation of the Risley prism assembly.

One embodiment of the optical system is wherein the center section wedge elements have a different prescription from the outer prism elements. In some cases, the center section is formed integrally with the outer section so that both sections rotate together. In certain embodiments, separate portions of the center section are each glued to one prism in the Risley prism assembly.

Another embodiment of the optical system is wherein the center section may be steered by rotating the Risley prism assembly.

In certain embodiments of the optical system, the center section is cored out to accommodate a separate optical system within a single aperture.

Yet another embodiment of the optical system further comprises another optical system, such as lenses or powered mirrors, wherein these optical systems are mechanically decoupled from rotation of the Risley prism elements.

In certain embodiments, the wavebands include one or more of ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

In some cases, the outer region comprises glass, semiconductor materials, or other substrate that is transmissive at the relevant waveband. In some cases, the center section comprises glass, semiconductor materials, or other substrate that is transmissive at the relevant waveband.

Another aspect of the present disclosure is an optical system, comprising: an outer region, wherein the outer region is a Risley prism assembly, constructed of two or more prism elements, and is transmissive to a first waveband; and a center section, wherein the center section is transmissive to a second waveband; the outer region and the center section are within a single aperture and the center section is a wedge element or elements having a prescription different from a prescription of the outer prism elements.

One embodiment of the optical system is wherein the center section is formed integrally with the Risley prism assembly. In some cases, separate portions of the center section are each glued to one prism in the Risley prism assembly.

Another embodiment of the optical system further comprises another optical system, such as lenses or powered mirrors, wherein these optical systems are mechanically decoupled from rotation of the Risley prism elements.

Yet another embodiment of the optical system is wherein the wavebands include one or more of ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

In certain embodiments, the outer region and/or the center section comprises glass, semiconductor materials, or other substrate that is transmissive at the relevant waveband.

Yet another aspect of the present disclosure is an optical system, comprising: an outer region, wherein the outer region is a Risley prism assembly, constructed of two prism elements, and is transmissive to a first waveband; and a center section, wherein the center section is transmissive to a second waveband; the outer region and the center section are within a single aperture and the outer region may be steered by rotating the Risley prism assembly; the wavebands include one or more of ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

One embodiment of the optical system is wherein the center section is cored out to accommodate a separate optical system within a single aperture.

Another embodiment of the optical system further comprises another optical system, such as lenses or powered mirrors, wherein these optical systems are mechanically decoupled from rotation of the Risley prism elements.

Yet another embodiment of the optical system is wherein the center section is a wedge element or elements having a prescription different from a prescription of the outer prism elements.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

In one embodiment, a normal Risley configuration with a cored out center is used with a pickoff mirror so that the aperture space can be used in a number of ways. In one case, it is used as in a secondary mirror obscuration for telescopes (see. e.g., FIG. 5). In another embodiment, a different wedge angle is used in an outer region as compared to a wedge angle used in the center section. This would be a path towards a two-element, single-substrate design that acts like an achromatic design if the two hands are spatially separated later.

The use of freeform optics and/or a spatial beam combiner allows the combination of multiple optical systems within a single aperture. When the beam combiner contains at least one axis of symmetry and the steering optics are capable of rotating, it is possible to combine a wide field of view (WFOV) staring system with a wide Field of Regard (FOR) steered narrow field of view (NFOV) system in a single aperture. The separation between WFOV and NFOV depends on the application; visible wavelength camera lenses are considered WFOV when they allow a given sensor to see more than 60° of full field angular object space whereas space telescopes are considered WFOV for full angles above 5°. The distinction between NFOV and WFOV is therefore relative, and for similar focal plane dimensions (length and width), the effective focal lengths between the WFOV and NFOV differ at least 2×.

In some cases, while the component could be more expensive, since the amount of surface to be removed may be small, there are a few manufacturing methods available, like single-point diamond turning (DT) using a slow-tool servo machine or magneto-rheological finishing (MRF). In certain embodiments of the system of the present disclosure, freeform DT is used to make the components.

Figure 1:
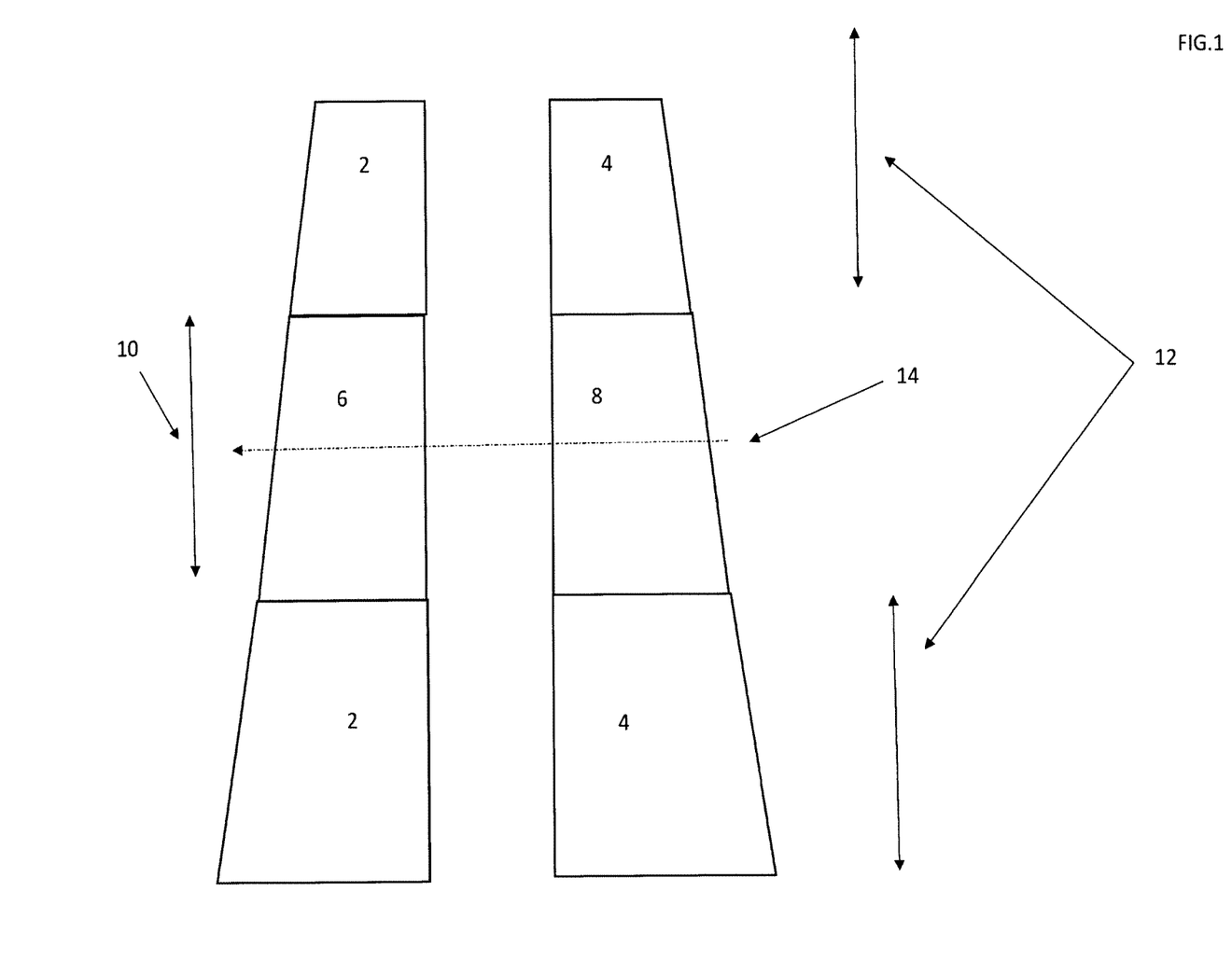
FIG. 1 shows a diagram of one embodiment of dissimilar optical systems co-located in a single aperture according to the principles of the present disclosure.

Referring to FIG. 1, a diagram of one embodiment of dissimilar optical systems co-located in a single aperture according to the principles of the present disclosure is shown. More specifically, a section view of a first Risley prism 2 and a second Risley prism 4 are shown. Risley prisms are an assembly consisting of two or more thin wedge prisms in series. The prisms, one each side, are usually identical. When the prisms are counter-rotated, the magnitude of beam deviation is changed. Similarly, when they are rotated together, the direction of deviation is rotated. Beam steering using Risley prisms is possible by rotating the wedge prisms independently of each other. A rotational axis 14 is shown.

Still referring to FIG. 1, an outer prismatic ring 12 is shown along with a prismatic center section 10 according to the principles of the present disclosure. Merc, a first prism insert 6 is co-located within a first half of the Risley prism assembly 2 and a second prism insert 8 is co-located within a second half Risley prism assembly 4.

In certain embodiments, center section prisms may be made of glass, semiconductor materials, or other types of substrates that are transmissive at the relevant waveband. In certain embodiments, the outer prisms may be made of glass (e.g., BK7, fused silica, chalcogenide, etc.), semiconductor materials (e.g., Germanium, Silicon, Zinc Sulfide, etc.), or other types of substrates that are transmissive at the relevant waveband as well (e.g., fluorides, salts, polymers, etc.). This may be realized with different glasses, different wedge angles, different thicknesses, or a combination of the three. In some embodiments, the disparate central core (6, 8) may be realized either by coring a host wedge and gluing a new element within it, or in the case of a common glasses, a single monolithic element may be ground to different prescriptions. In certain embodiments standard adhesives and/or RTVs are used to bond the lens assembly to the Risley assembly. RTV stands for room temperature vulcanizing. RTV silicone begins to cure immediately upon being exposed to air, as opposed to the curing agents in water-based sealants. It lends itself well to working as a sealer because it is water-repellent, adhesive find holds its shape.

Figure 2:
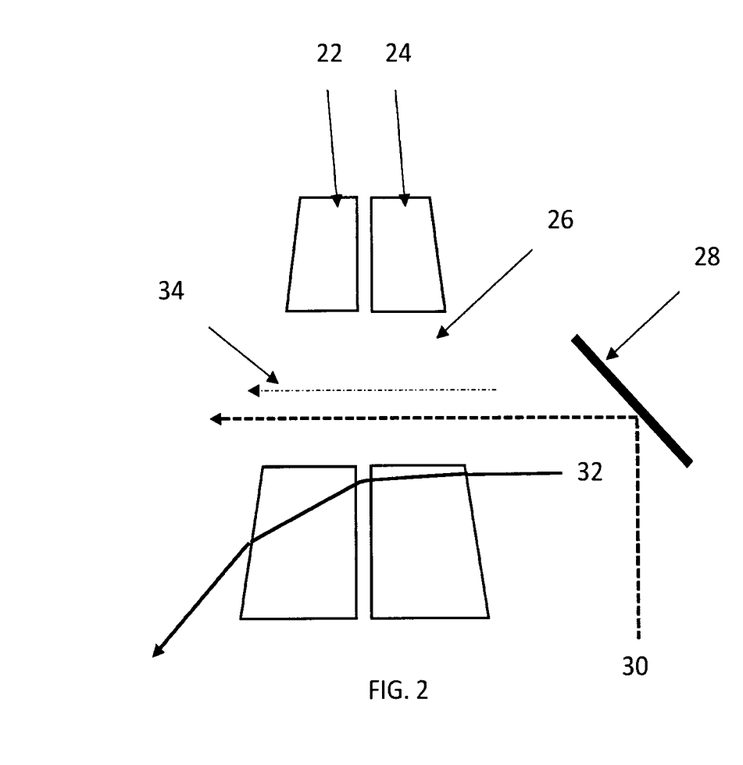
FIG. 2 shows a diagram of one embodiment of dissimilar optical systems co-located in a single aperture having cored Risley wedge elements according to the principles of the present disclosure.

Referring to FIG. 2, a diagram of one embodiment of dissimilar optical systems co-located in a single aperture having cored Risley wedges according to the principles of the present disclosure is shown. More specifically, a first half of a Risley prism assembly 22 and a second half Risley prism assembly 24 represent cross sections through two Risley wedges. The Risley elements rotate independently in a plane perpendicular to the black dashed line (the rotational axis 34). Central cores of each, element have been removed 26, leaving each Risley as an annular wedge. The lower ray 32 represents a notional primary beam path through the Risley prism, which may be steered by rotating the Risley elements, and the upper ray 30 represents a notional secondary path and because the Risley wedges have been cored, the ray is un-steered. Although shown with a simple mirror 28, this embodiment could accommodate other optical systems, such as lenses, powered mirrors, and the like. These systems are then mechanically decoupled from the rotation of the Risley wedges.

Figure 3:
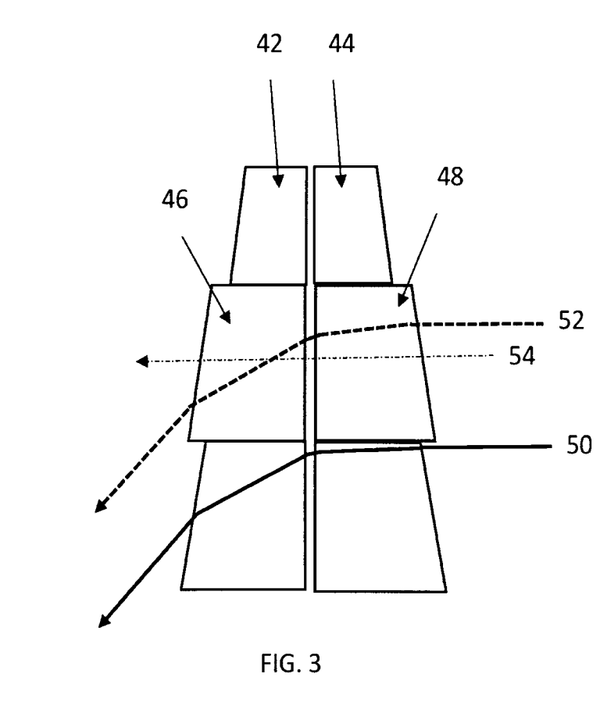
FIG. 3 shows a diagram of one embodiment of dissimilar optical systems co-located in a single aperture having stepped Risley wedge elements according to the principles of the present disclosure.

Referring to FIG. 3, a diagram of one embodiment of dissimilar optical systems co-located in a single aperture having stepped Risley wedge elements according to the principles of the present disclosure is shown. The inner Risley wedges can produce different steering than the outer region, allowing different field of regard coverage or allowing chromatic correction if the inner and outer regions cover widely-different spectral wavebands. More specifically, a first half of a Risley prism assembly 42 and a second half of the Risley prism assembly 44 represent cross sections through two Risley prism wedges. The elements rotate independently in the plane perpendicular to the black dashed line (rotation axis 54). Die central cores of each wedge element have been replaced with a different wedge prescription 46, 48. This may be realized with different glasses, different wedge angles, different thicknesses, or a combination of the three. In some embodiments, the disparate central core (46, 48) may be realized either by coring a host wedge and gluing a new element within it, or in the case of a common glasses, a single monolithic element may be ground to different prescriptions. In certain embodiments standard adhesives and/or RTVs are used to bond the lens assembly to the Risley assembly. RTV stands for room temperature vulcanizing. RTV silicone begins to cure immediately upon being exposed to air, as opposed to the curing agents in water-based sealants. It lends itself well to working as a sealer because it is water-repellent, adhesive and holds its shape.

Still referring to FIG. 3, the lower ray 50 represents a notional primary beam path through the Risley prism region, which may be steered by rotating the Risley elements. The upper ray 52 represents a notional secondary path and because the core and the annular elements have different prescriptions, the rays become co-boresight on exit. In some cases, this provides an alternate approach to providing achromatic steering. When this is combined with a conventional multi-wedge, it provides an alternate approach for producing very wideband Risley steering. For example, an application may require steering a visible spectrum signal in the inner ring and a longwave infrared spectrum in the outer ring; if two wedges of zinc selenide (ZnSe) were used with wedge angles of 12° each, light at 0.633 μm would be steered by 47° whereas light at 10.6 μm would be steered by 40°. If the inner and outer wedges were designed with different wedge angles, e.g. 12° for the visible wavelength waveband and 13.5° for the longwave infrared (LWIR) waveband, all of the energy will be steered towards the same object space region.

In certain embodiments where different Risley materials are used in the center section as compared to an outer region (or steps are created in the wedges), the approach can be used to (a) image two different wavebands using the same optical system and a two-color camera or (b) split the paths using a fold mirror and use two optical systems and two cameras. See, FIG. 4-FIG. 12.

Figure 4:
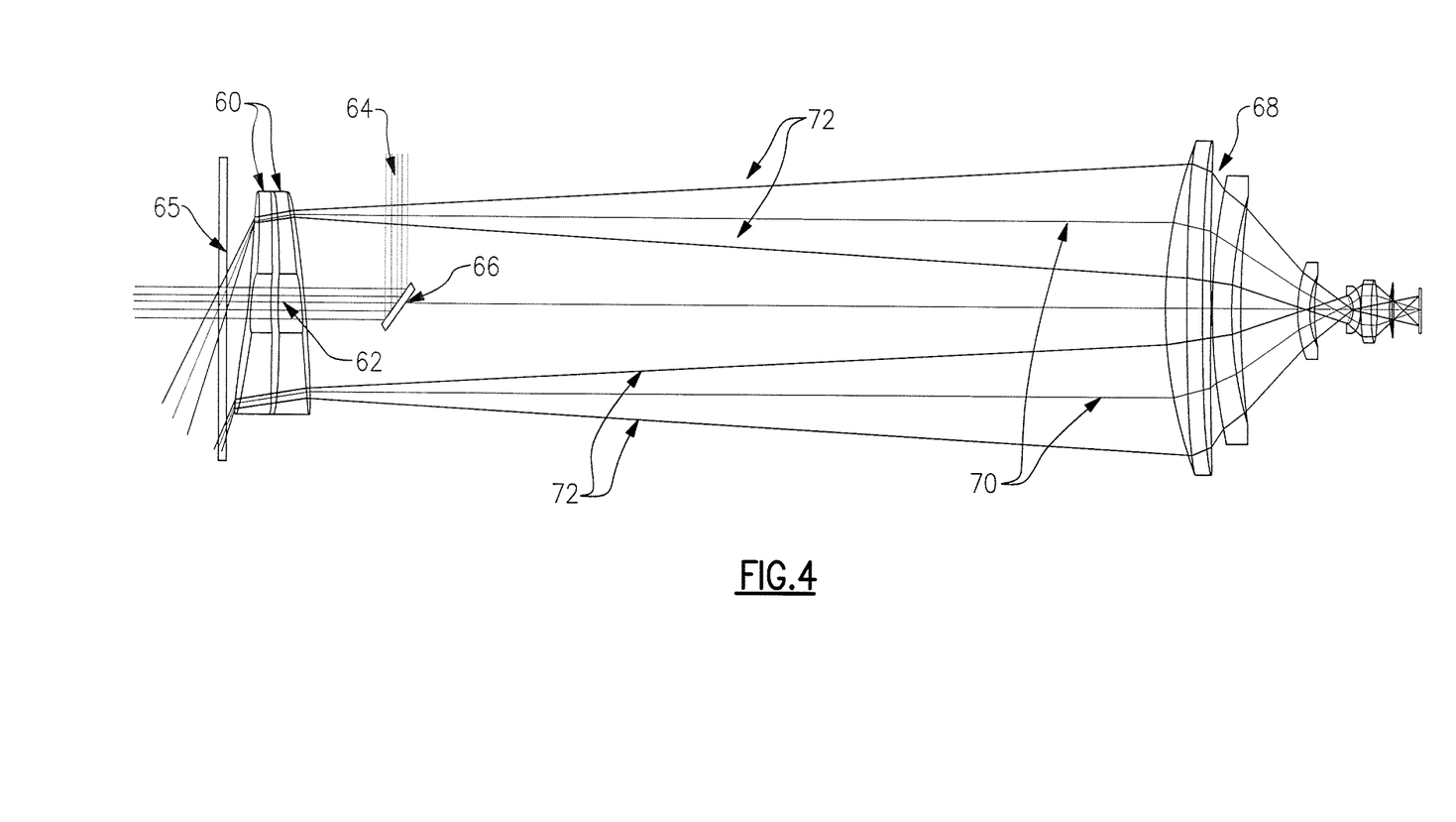
FIG. 4 shows a diagram of one embodiment of dissimilar optical systems co-located in a single aperture having a separate lens assembly and a cored Risley according to the principles of the present disclosure.

Referring to FIG. 4, a diagram of one embodiment of dissimilar optical systems co-located in a single aperture having a separate lens assembly according to the principles of the present disclosure is shown. More specifically, the wedge elements rotate about the optical axis to steer the outer waveband system, which collects photons from the outer ring. The center section (or lack thereof) is fixed (i.e. does not rotate with the wedge elements) and collects photons from the inner ring region. In certain cases, the baseline approach is for the WFOV optics to be detached from the Risley wedges. These figures do not show the required opto-mechanics like lens cells, spiders, or the like. The WFOV system 215 provides continuous monitoring of an area of interest while the steered NFOV system provides better resolution of a subset of the area of interest. In this embodiment, two prism elements make up a Risley prism assembly 60. The rays 64 are on-axis that focus onto the center of the focal plane and are reflected off a mirror or reflector 66 and pass through a cored out region 62 of the Risley prism assembly 60. The rays 70 are on-axis that focus onto the center of the focal plane and the rays 72 are full-field that focus onto the edge of the focal plane passing through the outer region optical subsystem 68. Merc, a single aperture 65 is used to capture the incoming signals, and is represented by a window. This configuration is convenient for a system where the transmitted laser energy is sent via path 64 and the receiver line of sight can be steered without affecting the transmitted energy. This system could be used in a situation where the combined system is on a moving platform, so that the receiver may either be used as a transceiver to detect the reflected laser energy or pointed elsewhere to detect other objects. An example use case is a vehicle LIDAR (light detection and ranging) system where the dual-band receiver is shared between detection of LIDAR objects in the SWIR band as well as providing thermal vision in the MWIR or LWIR band.

Figure 5:
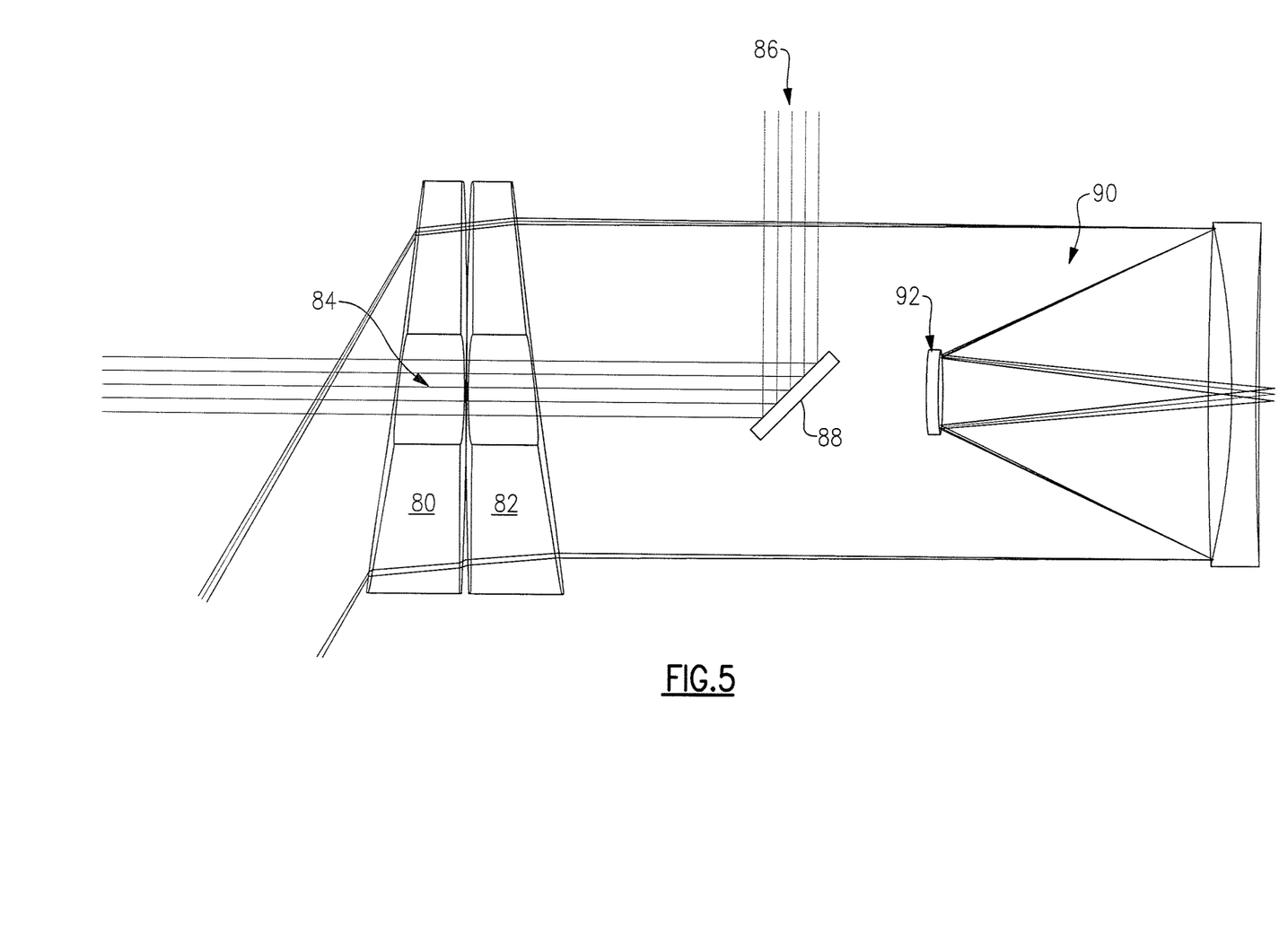
FIG. 5 shows a diagram of another embodiment of dissimilar optical systems co-located in a single aperture having a separate lens assembly and a cored Risley according to the principles of the present disclosure.

Referring to FIG. 5, a diagram of another embodiment of dissimilar optical systems co-located in a single aperture having a separate lens assembly according to the principles of the present disclosure is shown. More specifically, a diagram of another embodiment of the present disclosure where the inner subsystem is a reflective Cassegrain-type optical system instead of a refractive lens assembly is shown. This combination of systems, capitalizes on the fact that the smaller secondary mirror 92 in the Cassegrain design 90 obscures the central photons. Utilizing a cored region 84 in a Risley prism assembly (elements 80 and 82) by passing radiation 86 through the cored region 84 via a reflector or mirror 88 in the cored region 84 that is already obscured adds functionality without reducing performance of the outer optical system. In this case, the WFOV line of sight is fixed while the NFOV line of sight is steered by the Risley assembly. The WFOV in this embodiment receives photons that are reflected off objects for shorter wavelengths or emitted by objects for longer infrared wavelengths Note that, although the FOV of the reflective Cassegrain telescope is much less than the FOV of a refractive design, both are considered NFOV systems compared to the WFOV refractive design. This system has similar applications to the previous figure. The advantage of a reflective system is that the image quality at the focus of the optical system is stable across a wider wavelength range. This particular reflective optical system has a narrower field of view than the refractive optical system so provides better detection performance but needs to be steered for precisely.

Figure 6:
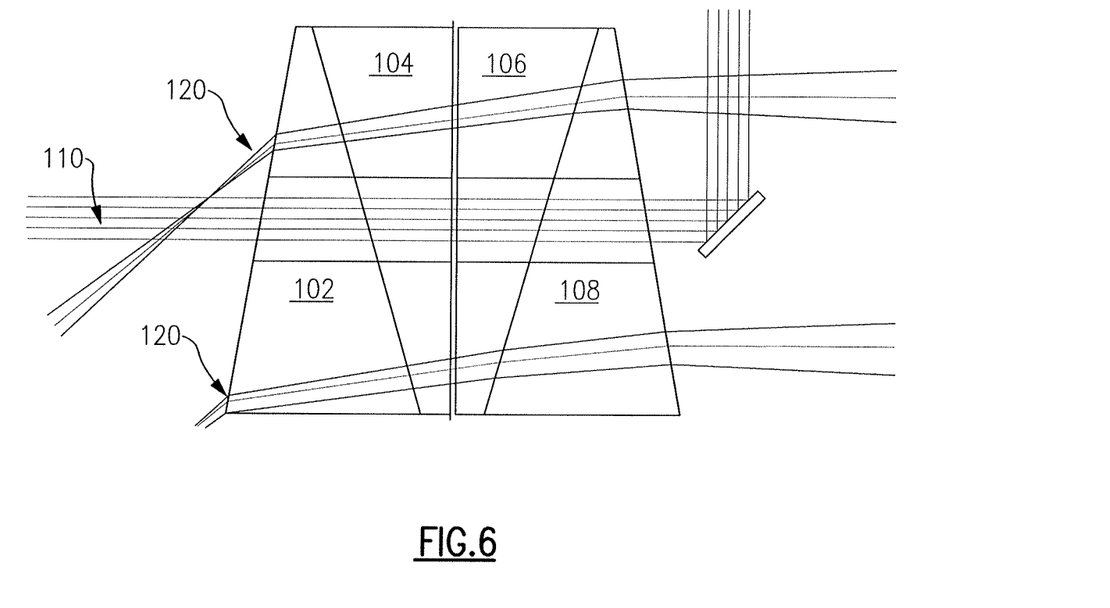
FIG. 6 shows a diagram of another embodiment of dissimilar optical systems co-located in a single aperture and a cored Risley assembly comprising four Risley wedge elements according to the principles of the present disclosure.

Referring to FIG. 6, a diagram of another embodiment of dissimilar optical systems co-located in a single aperture a cored Risley assembly comprising four Risley wedge elements according to the principles of the present disclosure is shown. More specifically, this embodiment has the same Tx/Rx design hut with a 4-element Risley assembly to better correct for chromatic errors in the Rx. Here, the two Risley pairs are 102, 104 and 106, 108. These form the outer region of the bored out Risley. The cored out Risley provides for a dissimilar optical system to exist in the center section 110 and remain unsteered, while the outer region 120 is steered as described herein.

Figure 7:
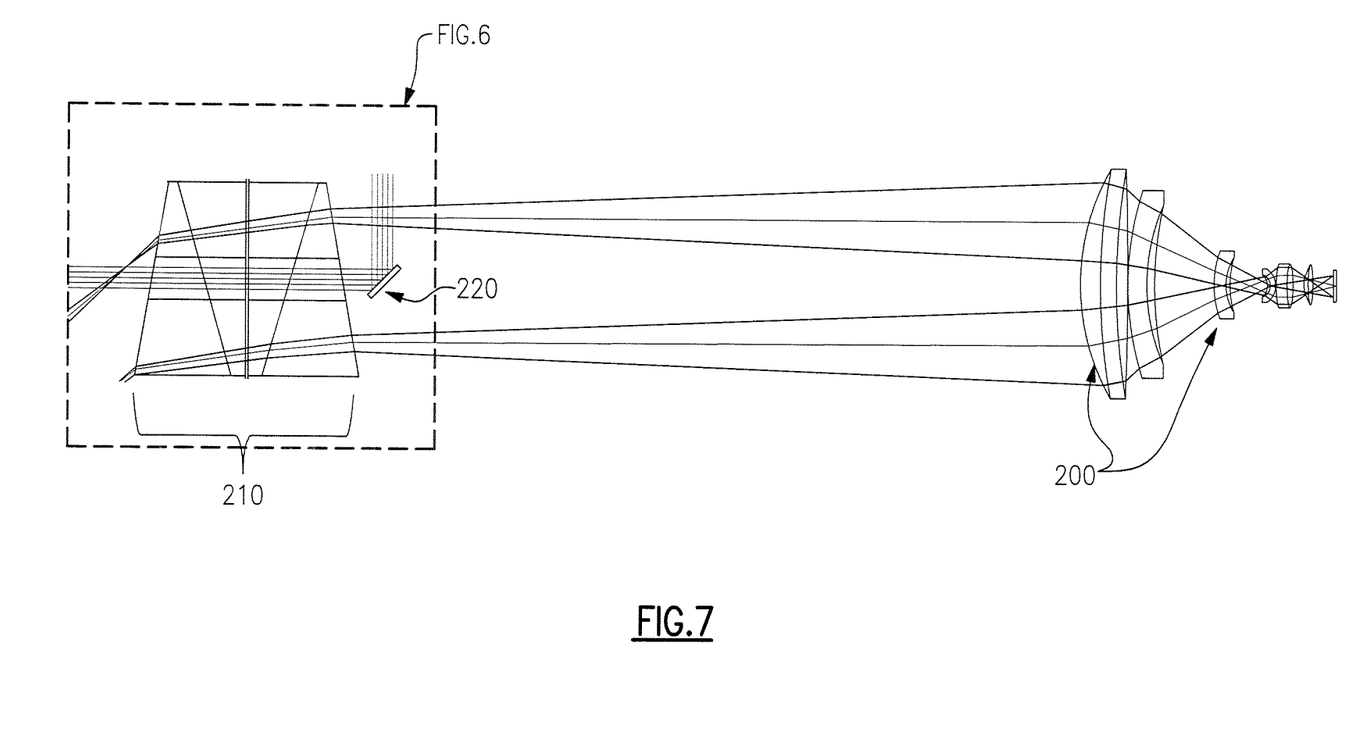
FIG. 7 shows a diagram of a wider view of the embodiment shown in FIG. 6 having dissimilar optical systems co-located in a single aperture having a separate lens assembly and a cored Risley assembly comprising four Risley wedge elements according to the principles of the present disclosure.

Referring to FIG. 7, a diagram of a wider view of the embodiment shown in FIG. 6 having dissimilar optical systems co-located in a single aperture having a separate lens assembly and a cored Risley assembly comprising four Risley wedge elements according to the principles of the present disclosure is shown. More specifically, this embodiment has a similar Tx/Rx design as other embodiments described herein, but with a 4-element Risley assembly to better correct for chromatic errors in the Rx as shown in FIG. 6. Here, one of the dissimilar optical system's 200 is a multi-lens assembly is steerable and passes through the outer region of the Risley prism assembly 210. The other dissimilar optical system is via the cored Risley prism assembly and is reflected via a pick up mirror 220 and remains unsteered via the Risley prism assembly. This system has similar applications to the previous figure. The advantage of additional Risley elements is that the steered performance is more achromatic, so the receiver can be used for a wider wavelength band, e.g. both MWIR and LWIR instead of just one.

Figure 8:
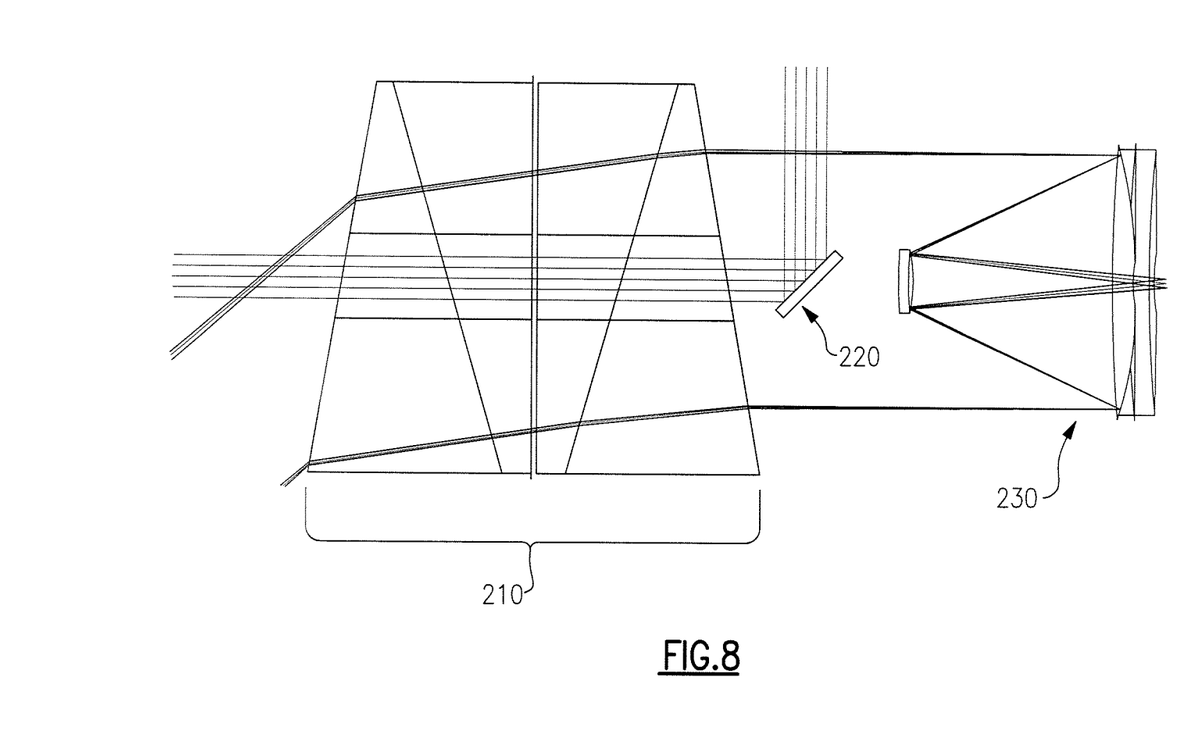
FIG. 8 shows a diagram of dissimilar optical systems co-located in a single aperture having a separate lens assembly and a cored Risley assembly comprising four Risley wedge elements according to the principles of the present disclosure.

Referring to FIG. 8, a diagram of dissimilar optical systems co-located in a single aperture having a separate lens assembly and a cored Risley assembly comprising four Risley wedge elements according to the principles of the present disclosure is shown. More specifically, this 4-element Risley assembly 210 is cored and is used with a Cassegrain 230 instead of a refractive receiver.

In certain embodiments, the wavebands for the center section and/or the outer region can include the ultraviolet (UV) region between 250 nm and 400 nm, the visible (VIS) region between 400 nm and 700 nm, the near-infrared (NIR) region between 700 nm and 1200 nm, the shortwave infrared (SWIR) region between 1200 nm and 2500 nm, the midwave infrared (MWIR) region between 2500 nm and 5500 nm, and the longwave infrared (LWIR) region between 5500 nm and 14000 nm.

Figure 9:
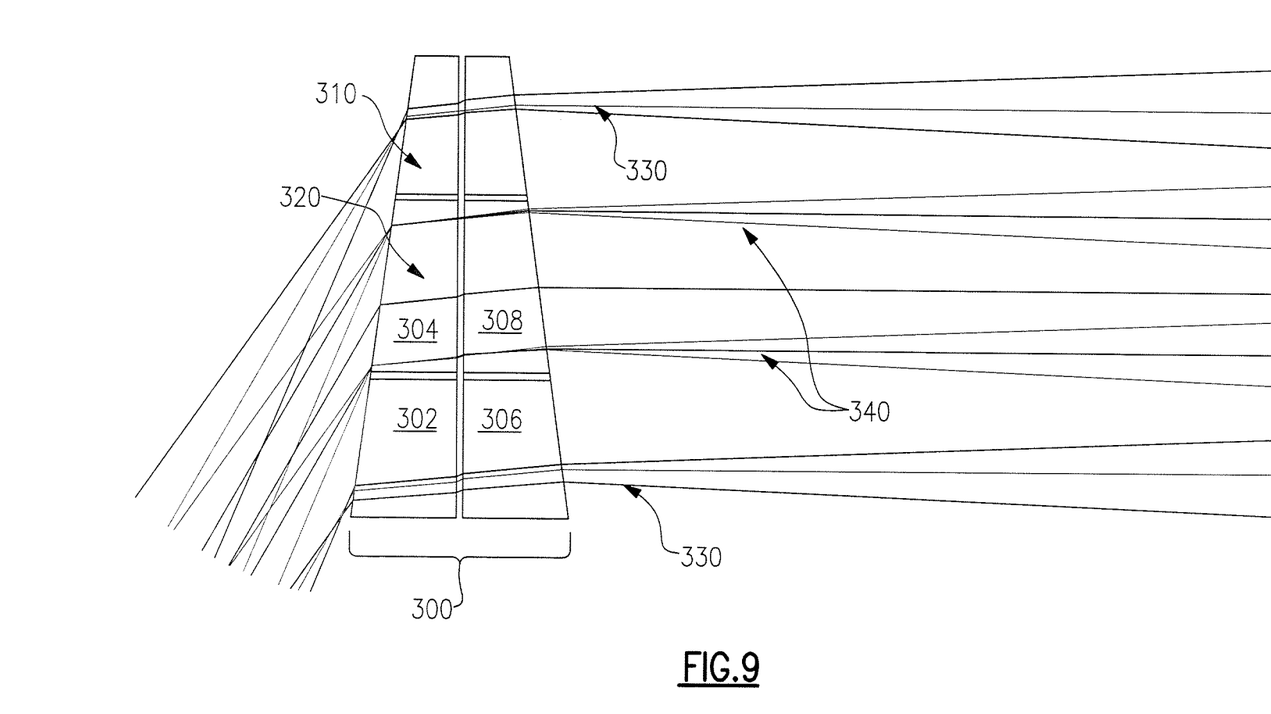
FIG. 9 shows a diagram of one embodiment of dissimilar optical systems co-located in a single aperture having achromatic wedges in a Risley assembly according to the principles of the present disclosure.
Figure 10:
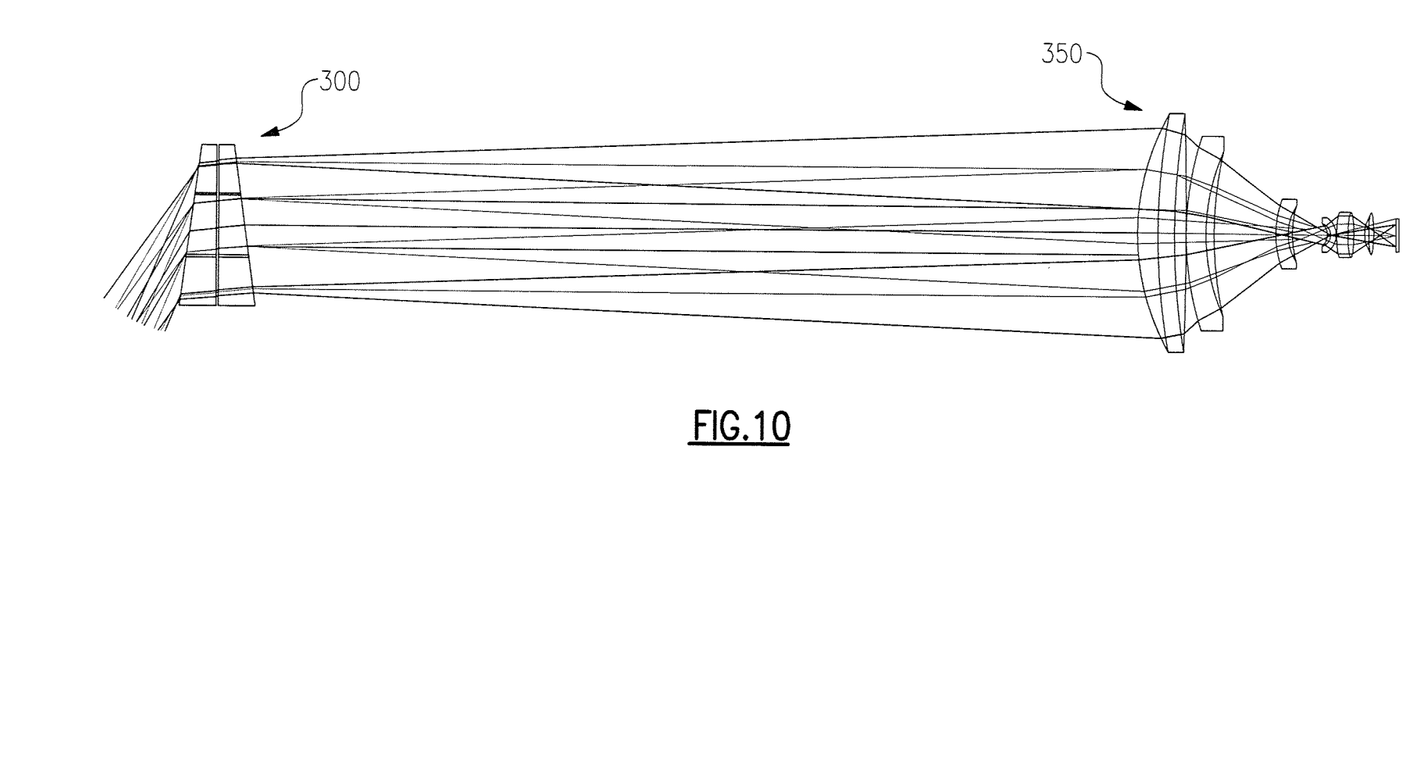
FIG. 10 shows a diagram of dissimilar optical systems co-located in a single aperture having a separate lens assembly and achromatic wedges in a Risley assembly according to the principles of the present disclosure.

Referring to FIG. 9 and FIG. 10, diagrams of one embodiment of dissimilar optical systems co-located in a single aperture having achromatic wedges in a Risley assembly according to the principles of the present disclosure are shown. More specifically, a system using achromatic wedges (302/304, 306/308) with different materials to steer two wavebands in the same direction are shown. The outer region 310 is used for one waveband whereas the center section 320 is used for another waveband. In FIG. 9, one optical assembly 300 images both bands (330, 340) into a dual-color sensor that separates the two wavebands on the sensor. An example use case is a broadband receiver that needs to detect energy in multiple infrared bands, like a thermal vision system for a moving vehicle that needs to work in the widest variety of environmental conditions, including seeing through precipitation, fog, and smoke, by using a SWIR/LWIR. SWIR/MWIR, or MWIR/LWIR camera. In this design, both wavebands will have the same field of view and the detector itself separates one band from the other within each pixel. Spatially separating the two bands using wedges with different prescriptions reduces the weight of the Risley pointer elements and allows it to operate faster and using less power than the alternative of adding additional Risley elements to achromatize the pointer.

Figure 11:
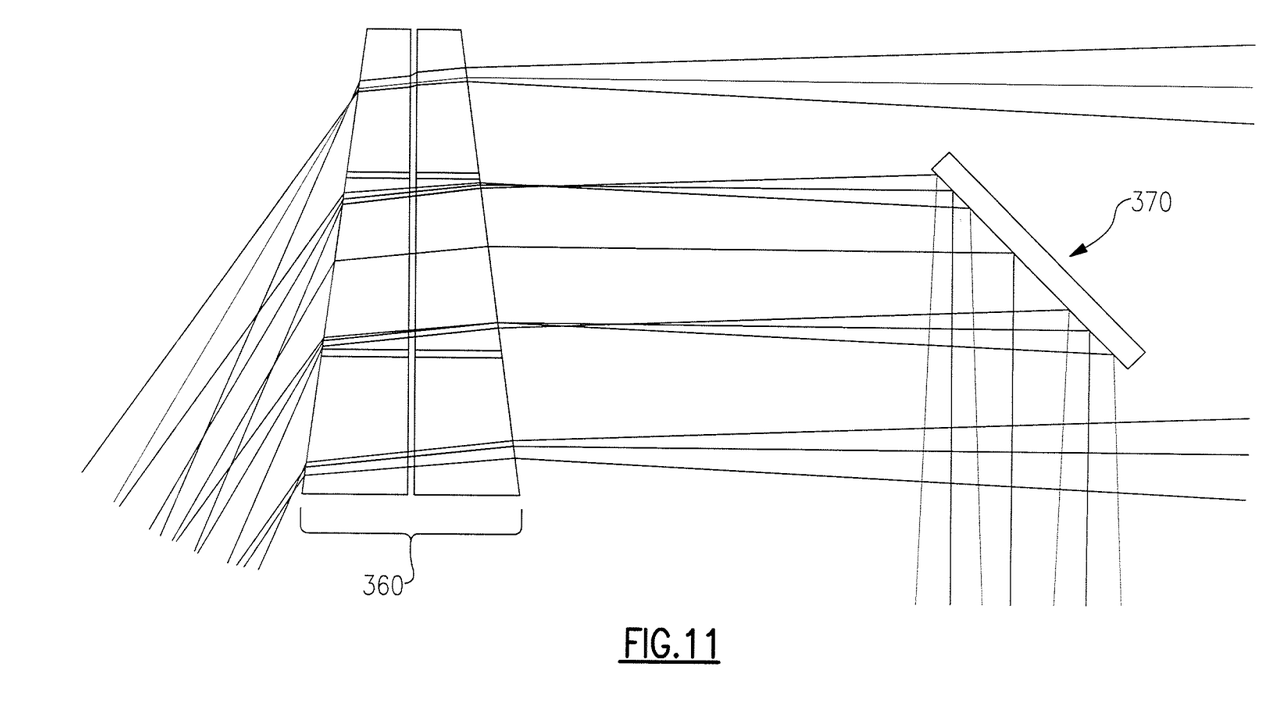
FIG. 11 shows a diagram another embodiment of dissimilar optical systems co-located in a single aperture having achromatic wedges in a Risley assembly according to the principles of the present disclosure.

Referring to FIG. 11, a diagram of another embodiment of dissimilar optical systems co-located in a single aperture having achromatic wedges in a Risley assembly according to the principles of the present disclosure is shown. More specifically, a system using achromatic wedges 360 with different materials to steer two wavebands in the same direction is shown. The outer region is used for one waveband whereas the center section is used for another waveband. In this figure, a mirror 370 is used to separate the wavebands. This configuration works for a system where the central portion is used for a transceiver in one waveband whereas the outer portion is used for detecting in another band. An example is a vehicle system that uses the Risley for scanning both a LIDAR transceiver in the central section and a thermal camera using the outer ring.

Figure 12:
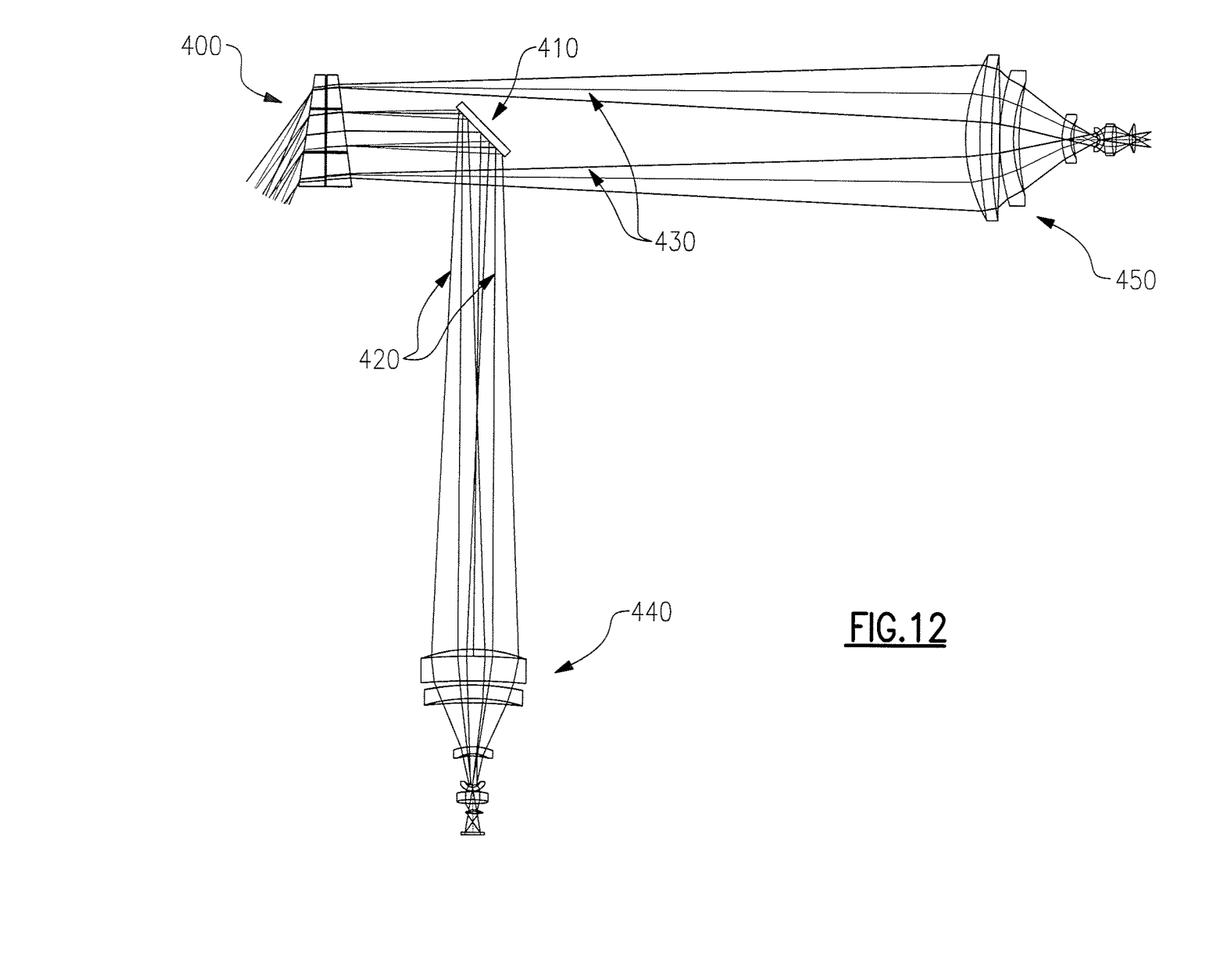
FIG. 12 shows a diagram of yet another embodiment of dissimilar optical systems co-located in a single aperture having achromatic wedges in a Risley assembly according to the principles of the present disclosure.

Referring to FIG. 12, a diagram of yet another embodiment of dissimilar optical systems co-located in a single aperture having achromatic wedges in a Risley assembly according to the principles of the present disclosure is shown. More specifically, a system using achromatic wedges with different materials 400 to steer both wavebands in the same direction is shown. The outer region is used for one waveband whereas the center section is used for another waveband. In this figure, a mirror 410 is used to separate the wavebands (420, 430) and each waveband is imaged by its own optical system and detector (440, 450). This system is an alternate way to create a multi-band optical system that uses two optical systems and two cameras; the additional optical system allows less complex, single-band detectors as well as providing the ability Tor the two cameras to have fields of view that are optimized for the particular band. This would also work well for a thermal camera on a moving vehicle, where the inner ring is used with a wider field of view to detecting warm objects in the LWIR band and the outer ring is used with a narrower field of view to identify objects in the SWIR or MWIR band to provide higher resolution.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising." or "having." and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. An optical system, comprising:
an outer region, wherein the outer region is a Risley prism assembly, constructed of two prism elements, and is transmissive to a first waveband; and a center section, wherein tire center section is transmissive to a second waveband; the outer region and the center section are within a single aperture and the outer region may be steered by rotating the Risley prism assembly, and the center section may remain unsteered during rotation of the Risley prism assembly; the photons from the outer region do not reach the center section and vice versa.

2. The optical system according to claim 1, wherein
the center section is a wedge element having a prescription different from a prescription of the Risley prism elements.

3. The optical system according to claim 2, wherein
the center section is formed integrally with the Risley prism assembly.

4. The optical system according to claim 2, wherein
separate portions of the center section are each glued to one prism in the Risley prism assembly.

5. The optical system according to claim 2, wherein
the center section may be steered by rotating the Risley prism assembly.

6. The optical system according to claim 1, wherein
the center section is cored out to accommodate a separate optical system within a single aperture.

7. The optical system according to claim 1, further comprising
another optical system, such as lenses or powered mirrors, wherein these optical systems are mechanically decoupled from rotation of the Risley prism elements.

8. The optical system according to claim 1, wherein
the wavebands include one or more of ultraviolet (UV) region between 250 nm and 400 nm, visible (VIS) region between 400 nm and 700 nm, near-intrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

9. The optical system according, to claim 1, wherein
the outer region comprises glass, semiconductor materials, or other substrate that is transmissive at the relevant waveband.

10. The optical system according to claim 1, wherein
the center section comprises glass, semiconductor materials, or other substrate that is transmissive at the relevant waveband.

11. An optical system, comprising:
an outer region, wherein the outer region is a Risley prism assembly, constructed of two prism elements, and is transmissive to a first waveband; and a center section, wherein the center section is transmissive to a second waveband; the outer region and the center section are within a single aperture and the center section is a wedge element having a prescription different from a prescription of the Risley prism elements.

12. The optical system according to claim 11, wherein
the center section is formed integrally with the Risley prism assembly.

13. The optical system according to claim 11, wherein
separate portions of the center section are each glued to one prism in the Risley prism assembly.

14. The optical system according to claim 11, further comprising
another optical system, such as lenses or powered mirrors, wherein these optical systems are mechanically decoupled from rotation of the Risley prism elements.

15. The optical system according to claim 11, wherein
the wavebands include one or more of ultraviolet (UV) region between 250 nm and 400 nm, visible (VIS) region between 400 nm and 700 nm, near-infrared (NIR) region between 700 nm and 1200 nm, shortwave infrared (SWIR) region between 1200 nm and 2500 nm, midwave infrared (MWIR) region between 2500 nm and 5500 nm, and longwave infrared (LWIR) region between 5500 nm and 14000 nm.

16. The optical system according to claim 11, wherein
the outer region and/or the center section comprises glass, semiconductor materials, or other substrate that is transmissive at the relevant waveband.

17. An optical system, comprising:
an outer region, wherein the outer region is a Risley prism assembly, constructed of two prism elements, and is transmissive to a first waveband; and a center section, wherein the center section is transmissive to a second waveband and is cored out to accommodate a separate optical system within a single aperture; the outer region and the center section are within a single aperture and the outer region may be steered by rotating the Risley prism assembly; the wavebands include one or more of ultraviolet (UV) region between 250 nm and 400 nm, visible (VIS) region between 400 nm and 700 nm, near-infrared (NIR) region between 700 nm and 1200 nm, and shortwave infrared (SWIR) region between 1200 nm and, wherein the center section is a wedge element having a prescription different from a prescription of the Risley prism elements.

18. The optical system according to claim 17, further comprising
another optical system, such as lenses or powered mirrors, wherein these optical systems are mechanically decoupled from rotation of the Risley prism elements.

* * * * *

UNITED STATES PATENT AND TRADEMARK OFFICE
CERTIFICATE OF CORRECTION

| | |
|---|---|
| PATENT NO. | : 11,474,363 B2 |
| APPLICATION NO. | : 16/718919 |
| DATED | : October 18, 2022 |
| INVENTOR(S) | : Jeffrey L. Jew, Ian B. Murray and Michael J. Shaw |

It is certified that error appears in the above-identified patent and that said Letters Patent is hereby corrected as shown below:

In the Claims

Claim 1, Column 9, Line 40, delete "tire" and insert -- the --

Claim 8, Column 10, Line 4, delete "near-intrared" and insert -- near-infrared --

Signed and Sealed this
Twelfth Day of March, 2024

Katherine Kelly Vidal
*Director of the United States Patent and Trademark Office*